(12) United States Patent
Moerth

(10) Patent No.: US 12,328,039 B2
(45) Date of Patent: Jun. 10, 2025

(54) CURRENT TRANSMISSION SUB-DEVICE OF A CURRENT-EXCITED SYNCHRONOUS MACHINE AS A DRIVE MOTOR IN A HYBRID ON ELECTRIC VEHICLE

(71) Applicant: Bayerische Motoren Werke Aktiengesellschaft, Munich (DE)

(72) Inventor: Philip Moerth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/288,204

(22) PCT Filed: May 12, 2022

(86) PCT No.: PCT/EP2022/062871
§ 371 (c)(1),
(2) Date: Oct. 25, 2023

(87) PCT Pub. No.: WO2022/268404
PCT Pub. Date: Dec. 29, 2022

(65) Prior Publication Data
US 2024/0204631 A1    Jun. 20, 2024

(30) Foreign Application Priority Data
Jun. 21, 2021   (DE) ..................... 10 2021 115 993.8

(51) Int. Cl.
*H02K 13/10*       (2006.01)
*H01R 39/38*       (2006.01)
(Continued)

(52) U.S. Cl.
CPC ........... *H02K 13/10* (2013.01); *H01R 39/383* (2013.01); *H01R 39/385* (2013.01); *H01R 39/415* (2013.01); *H02K 13/003* (2013.01)

(58) Field of Classification Search
CPC ...... H02K 13/10; H02K 13/003; H02K 5/148; H02K 5/145; H01R 39/383; H01R 39/385; H01R 39/415; H01R 39/36
(Continued)

(56) References Cited

U.S. PATENT DOCUMENTS

| 3,474,274 A | 10/1969 | Groschopp et al. |
| 4,554,476 A | 11/1985 | Gotoh |

(Continued)

FOREIGN PATENT DOCUMENTS

| DE | 10 2008 044 189 A1 | 6/2010 |
| DE | 10 2013 101 759 A1 | 8/2013 |

(Continued)

OTHER PUBLICATIONS

International Search Report (PCT/ISA/210) issued in PCT Application No. PCT/EP2022/062871 dated Sep. 21, 2022 with English translation (4 pages).

(Continued)

Primary Examiner — Ahmed Elnakib
(74) Attorney, Agent, or Firm — Crowell & Moring LLP

(57) ABSTRACT

A high-voltage accumulator module having a multiplicity of battery cells arranged in a honeycombed parallel- and series connection assembly (for example, "honeycomb"). The gaps between the battery cells are filled with a thermally and electrically conductive potting compound. The battery cells are electrically insulated with respect to the potting compound. The potting compound is connected to an energy source via electrically conductive fixing elements that protrude into the potting compound and via two pole connections in such a way that a current flow through the potting compound which is as homogenous as possible is achieved. The two pole connections, for example, in the form of metal plates, may be fastened to the potting compound over a large (Continued)

surface area and in close electrical contact therewith by the fixing elements. The fixing elements may protrude as deep as possible into the potting compound in the form of strips or pins and may contain barbs.

7 Claims, 8 Drawing Sheets

(51) Int. Cl.
  *H01R 39/415* (2006.01)
  *H02K 13/00* (2006.01)
(58) Field of Classification Search
  USPC .......................................................... 310/148
  See application file for complete search history.

(56) References Cited

U.S. PATENT DOCUMENTS

| 2012/0062067 | A1 | 3/2012 | Shim et al. | |
|---|---|---|---|---|
| 2013/0221796 | A1 | 8/2013 | Neet et al. | |
| 2015/0244129 | A1* | 8/2015 | Neet | H01R 39/40 |
| | | | | 310/242 |
| 2018/0248441 | A1 | 8/2018 | Bock | |

FOREIGN PATENT DOCUMENTS

| DE | 10 2013 222 629 A1 | 5/2015 |
|---|---|---|
| DE | 10 2015 220 897 A1 | 4/2017 |
| EP | 0 874 424 A2 | 10/1998 |
| JP | 59-15237 Y2 | 5/1984 |
| JP | 59-132747 A | 7/1984 |

OTHER PUBLICATIONS

German-language Written Opinion (PCT/ISA/237) issued in PCT Application No. PCT/EP2022/062871 dated Sep. 21, 2022 with English translation (12 pages).

German-language Search Report issued in German Application No. 10 2021 115 993.8 dated Feb. 14, 2022 with partial English translation (11 pages).

Korean-language Office Action issued in Korean Application No. 10-2023-7028392 dated Dec. 6, 2024 with English translation (9 pages).

* cited by examiner

Stationary part of a CSM rotor current transmitter

CURRENT TRANSMISSION SUB-DEVICE OF A CURRENT-EXCITED SYNCHRONOUS MACHINE AS A DRIVE MOTOR IN A HYBRID ON ELECTRIC VEHICLE

BACKGROUND AND SUMMARY OF THE INVENTION

The present invention relates to a current transmission sub-device of a current-excited synchronous machine as a drive motor in a hybrid or electric vehicle, the rotor of which has slip rings for the current supply and is contacted and supplied with electrical energy by means of carbon brushes of the so-called brush holding module. The current transmission sub-device relates to the stationary part of a rotor current transmitter, which comprises the brush holding module.

Such devices are known, for example, from the printed publications DE 10 2013 222 629 A1, DE 10 2008 044 189 A1 and DE 10 2015 220 897 A1. The known current transmission sub-devices are, in particular, brush holding systems having so-called brush holders or brush compartments. For example, DE 10 2013 222 629 A1 describes a brush plate (brush carrier) with brush holders (brush compartments) arranged thereon. In this case, a plurality of brush holders having a carbon brush respectively arranged therein are provided, the carbon brushes being received in the brush holders while being displaceable in the radial direction. The brush holders are firmly connected to the brush plate.

It is an object of the present invention to further develop an aforementioned current transmission sub-device with a view to reliable prevention of unintended short circuits of a brush stranded conductor to housing components.

This object is achieved according to the invention by the features of the independent patent claim. The dependent claims relate to advantageous developments of the invention.

The current transmission sub-device according to the invention relates to a carbon brush system with a brush holding module for electric motors. In a basic layout of an electrical energy supply in a hybrid or electric vehicle known from the prior art, in very simple terms a high-voltage battery is connected via corresponding terminals of the high-voltage potentials to a high-voltage inverter and is connected via the latter to an electric drive motor, which in this case is a CSM synchronous motor. In the case of using a current-excited synchronous machine CSM, an excitation current for a rotor of the synchronous machine CSM is provided by means of a bridge circuit in the region of the high-voltage inverter. Separately from this, a stationary part of a rotor current transmitter of the drive motor is supplied with correspondingly conditioned electrical energy by the high-voltage inverter via supply lines. The invention relates to the transmission of this high-voltage energy from the stationary part of a rotor current transmitter to the rotor via carbon brushes.

The invention is based on the following considerations:

In electric drive systems, there are particularly stringent requirements in respect of the high-voltage insulation, or in respect of safety measures when delivering electrical high voltage via components on an e-machine, particularly in the form of a current-excited synchronous motor (CSM), for example, via current-carrying stranded conductors and carbon brushes of a current transmission sub-device. Because of thermal and chemical requirements, such high-voltage stranded conductors are preferably not insulated by means of a shrink tube and therefore need to be protected in another way. A thermally optimized concept is not isolated from the periphery (conductive ground parts) by an insulation housing, so that there is a risk of high-voltage components making contact with housing components.

The underlying idea of the invention is, in particular, alternative sheet-metal stamping and/or bending in the carbon brush compartment in order to modify a press-in direction, the length and the fastening guide of an uninsulated stranded copper conductor which is pre-mounted in a carbon brush.

According to the invention, the current transmission sub-device as a stationary part of the current transmitter of a current-excited synchronous motor ("CSM") has a plurality of brush compartments for receiving carbon brushes. The electrical connection of a carbon brush is carried out using an integrated (pre-mounted, in particular pressed-in) stranded copper conductor. The stranded copper conductor may be applied laterally or at the front on the carbon brush (in relation to the suspension of the carbon brush). The stranded copper conductor is guided through a (sheet-metal-stamped) recess (laterally or at the front) in the brush compartment, which allows insertion of the brush actually to be held with an accurate fit, despite the stranded conductor. The recess (partial slit) is provided particularly in the region of the exit of the stranded conductor from the brush and therefore serves as a stranded-conductor guide as far as the end position of the brush in the compartment. This recess or stranded-conductor guide furthermore has a lug in order to guide the stranded conductor loosely but with the shortest possible length for attachment (fastening guide) to the brush carrier and to safeguard against flapping. The lug-shaped stranded-conductor guide is therefore provided in order to counteract shearing of the stranded conductor pre-mounted on the brush during insertion into the brush compartment already fixed on the metal carrier sheet, and at the same time as protection against flapping.

Other features and advantages of embodiments according to the invention are explained in more detail below with reference to exemplary embodiments with the aid of the drawing in which, in a schematic representation,

DETAILED DESCRIPTION OF THE DRAWINGS

Figure 1:
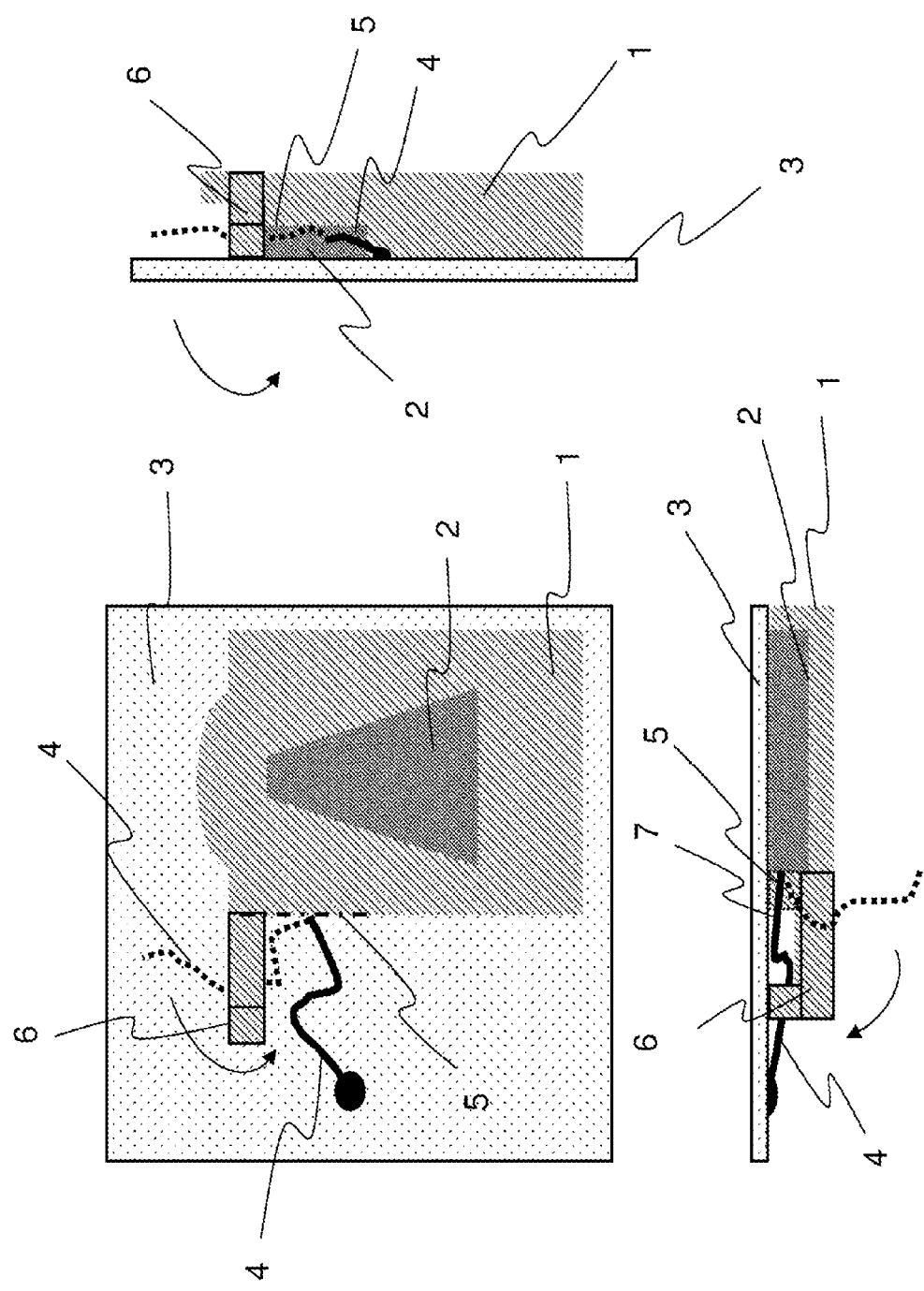
FIG. 1 shows an outline representation of a first exemplary embodiment according to the invention of a configuration of the carbon brush holder with a lateral recess and a lateral bracket forming a lug, in three different viewing directions.

Throughout the various figures, the same reference signs are always used for elements which are the same. This being the case, only a use in a vehicle with an electrical energy supply from an accumulator, or a high-voltage storage unit, will be described below without restriction.

Essentially, for all of FIGS. 1 to 7 it is the case that a current transmission sub-device according to the invention of a separately excited synchronous machine (CSM) has at least one brush compartment 1 for receiving a carbon brush 2, that the carbon brush 2 has a pre-mounted stranded conductor 4, and that the brush compartment 1 is applied on a brush carrier 3. Furthermore, the brush compartment 1 has a lug-shaped stranded-conductor guide, consisting of a recess 5 and a lug 7 (in the broadest sense, this also includes a partial lug), in such a way that the carbon brush 2 can be inserted with an accurate fit into the brush compartment 1 despite the stranded conductor 4 and the stranded conductor 4 can then be threaded through the lug-shaped stranded-conductor guide 5 and 7 for connection to the brush carrier 3 so as to reduce flapping.

In this regard, FIG. 1 schematically represents a first advantageous exemplary embodiment. The stranded-conductor guide 5 is in this case configured as a lateral recess of the brush compartment 1, a lug 7 being formed by a bridge-like connection in the form of a bracket 6 from the upper recess edge of the brush compartment 1 to the brush carrier 3. The bridge-like connection 6 is at a distance from the carbon brush 2 in such a way that the stranded conductor 4 can be threaded through the lug 7 thereby created, and is substantially protected against flapping by the lug 7 after fastening on the brush carrier 3.

Figure 2:
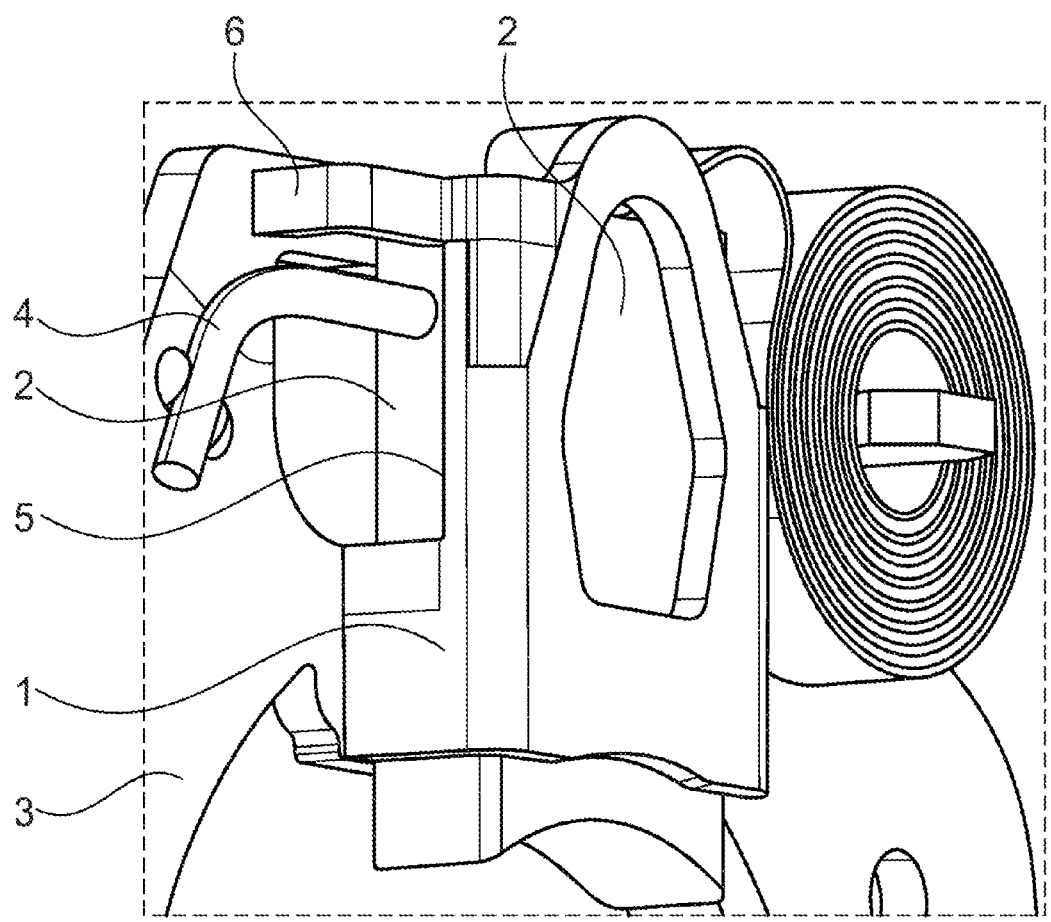
FIG. 2 shows a three-dimensional view of a specific embodiment of the first exemplary embodiment in a side view from the left.

FIG. 2 shows a three-dimensional view of a specific embodiment of the first exemplary embodiment according to FIG. 1 in a side view from the left.

Figure 3:
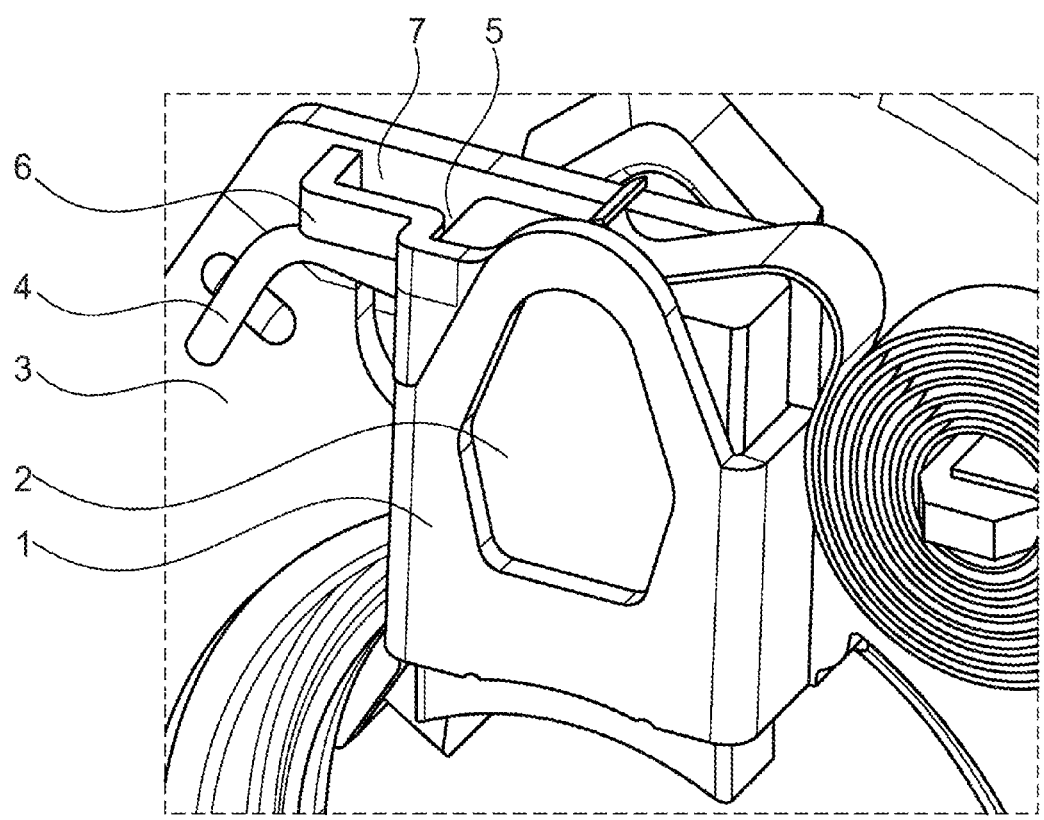
FIG. 3 shows a three-dimensional view of a specific embodiment of the first exemplary embodiment in a side view from the right.

FIG. 3 shows a three-dimensional view of a specific embodiment of the first exemplary embodiment according to FIG. 1 in a side view from the right.

Figure 4:
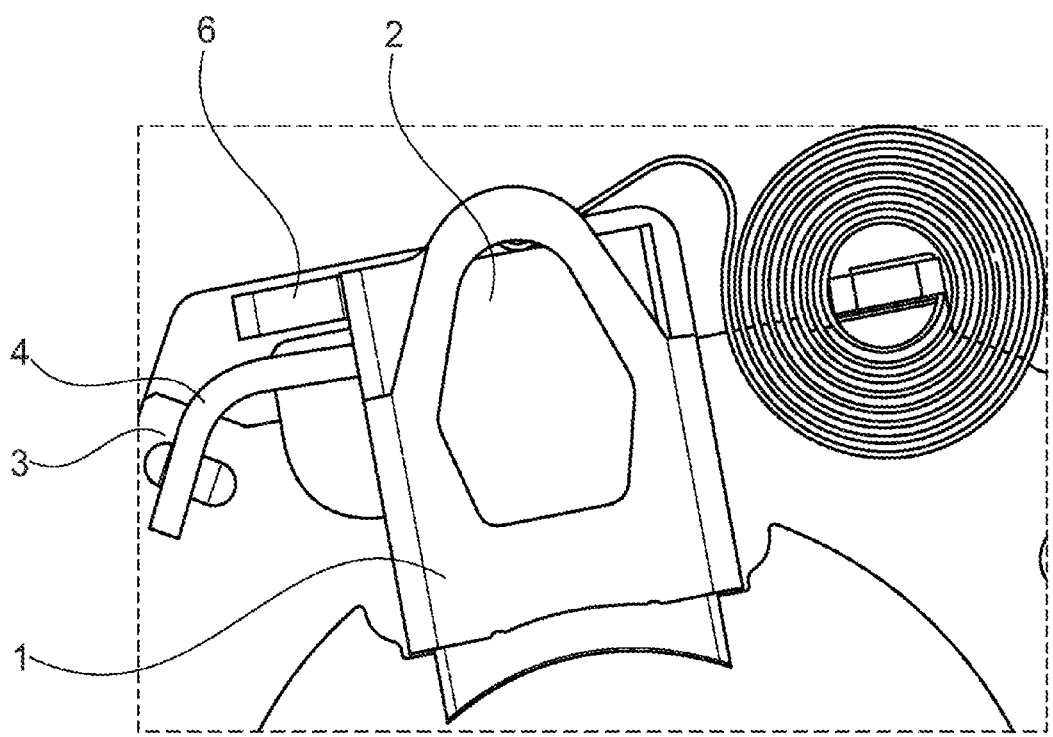
FIG. 4 shows a three-dimensional view of a specific embodiment of the first exemplary embodiment in a plan view from the front.

FIG. 4 shows a three-dimensional view of a specific embodiment of the first exemplary embodiment according to FIG. 1 in a plan view from the front.

Figure 5:
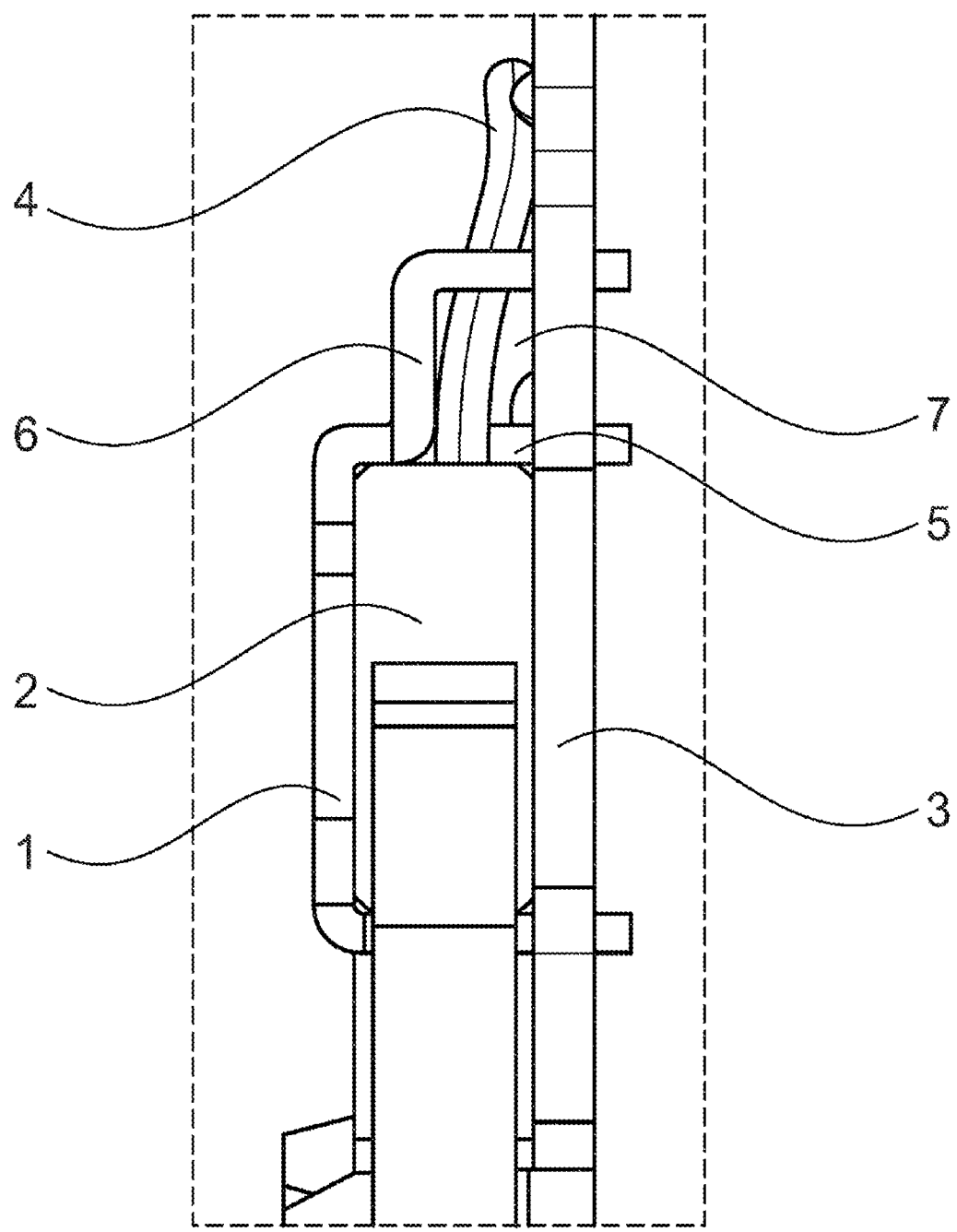
FIG. 5 shows a three-dimensional view of a specific embodiment of the first exemplary embodiment in a plan view from above.

FIG. 5 shows a three-dimensional view of a specific embodiment of the first exemplary embodiment according to FIG. 1 in a plan view from above.

Figure 6:
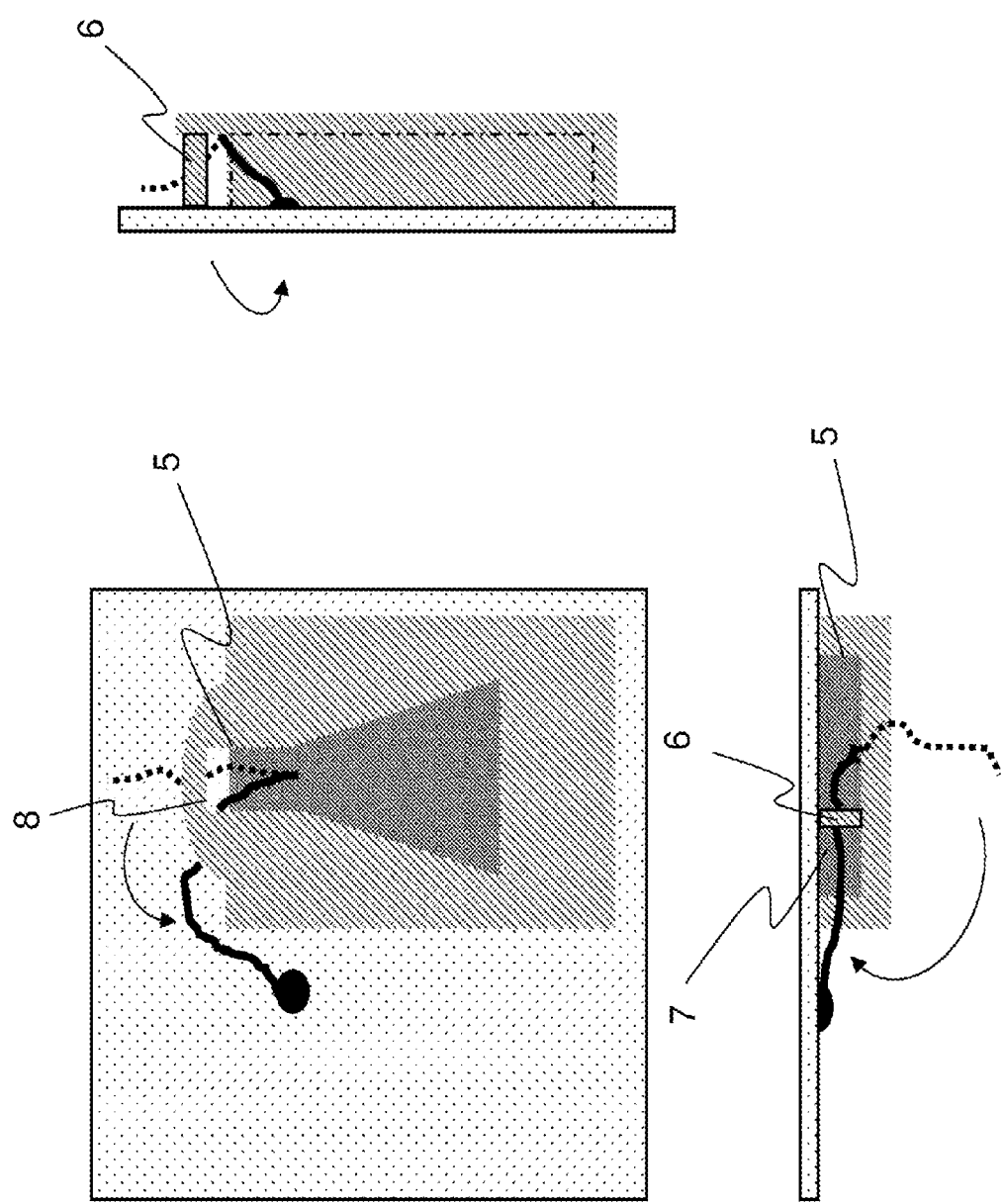
FIG. 6 shows an outline representation of a second exemplary embodiment according to the invention of a configuration of the carbon brush holder with a front recess and a bar forming a lug, which protrudes in the longitudinal direction, in three different viewing directions.

FIG. 6 shows a second exemplary embodiment according to the invention of the above-described basic configuration (which applies for all of FIGS. 1 to 7). The stranded-conductor guide 5 is in this case configured as a front recess of the brush compartment 1, a lug 7 being formed by a bridge-like connection 6 in the form of a bar from the upper recess edge 8, which protrudes upward beyond the carbon brush 2, to the brush carrier 3. This bridge-like connection 6 is again at a distance from the carbon brush 2 in such a way that the stranded conductor 4 can be threaded through the lug 7 thereby created.

Figure 7:
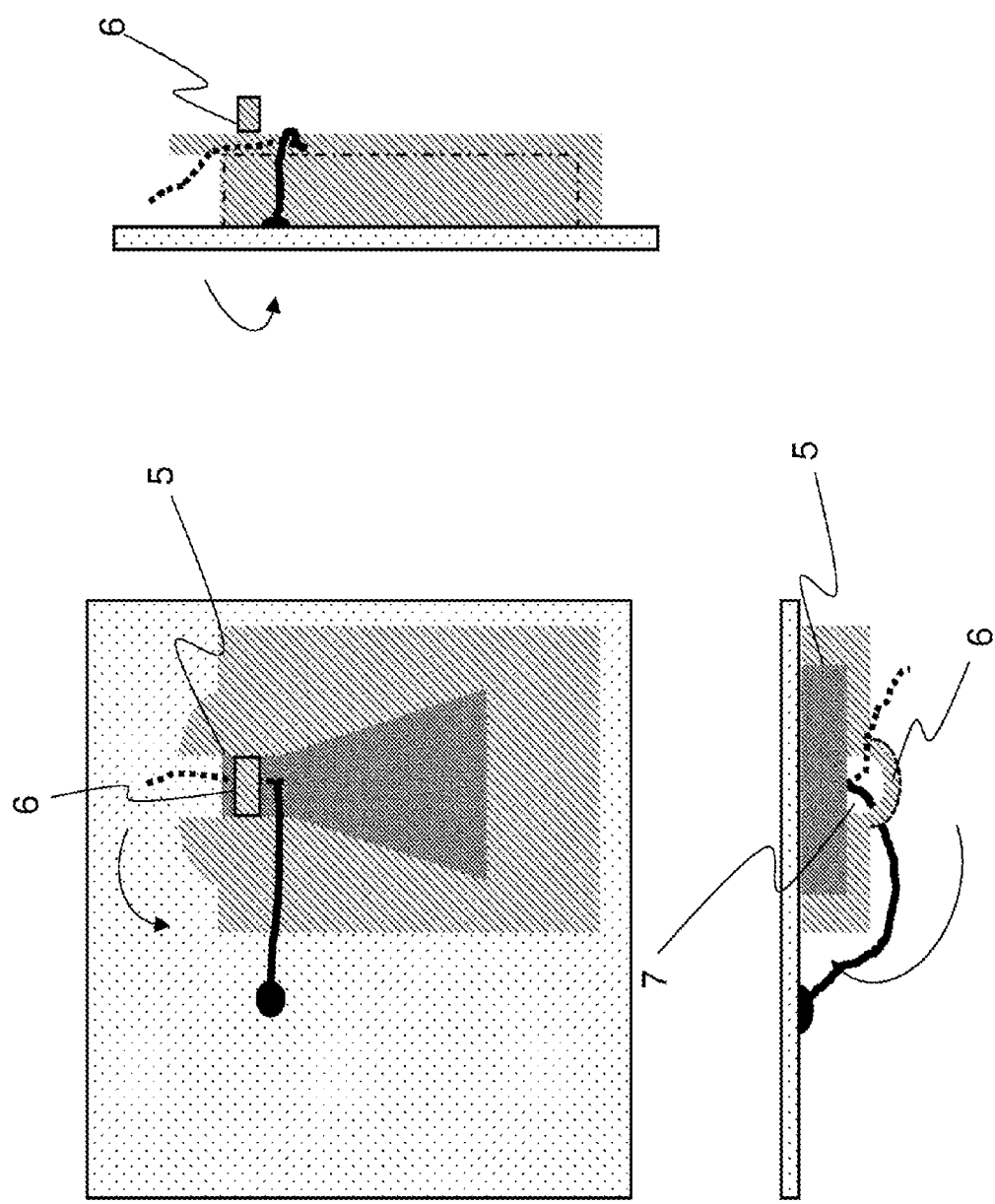
FIG. 7 shows an outline representation of a third exemplary embodiment according to the invention of a configuration of the carbon brush holder with a front recess and a half-lug forming a lug, which is convex at the front, in three different viewing directions.

FIG. 7 shows a third exemplary embodiment according to the invention of the above-described basic configuration (which applies for all of FIGS. 1 to 7). The stranded-conductor guide 5 is in this case configured as a front recess of the brush compartment 1, a lug 7 being formed by a bridge-like connection 6 in the form of a half-lug protruding forward from the left recess edge to the right recess edge of the brush compartment 1. Here as well, this bridge-like connection 6 is again at a distance from the carbon brush 2 in such a way that the stranded conductor 4 can be threaded through the lug 7 thereby created.

Figure 8:
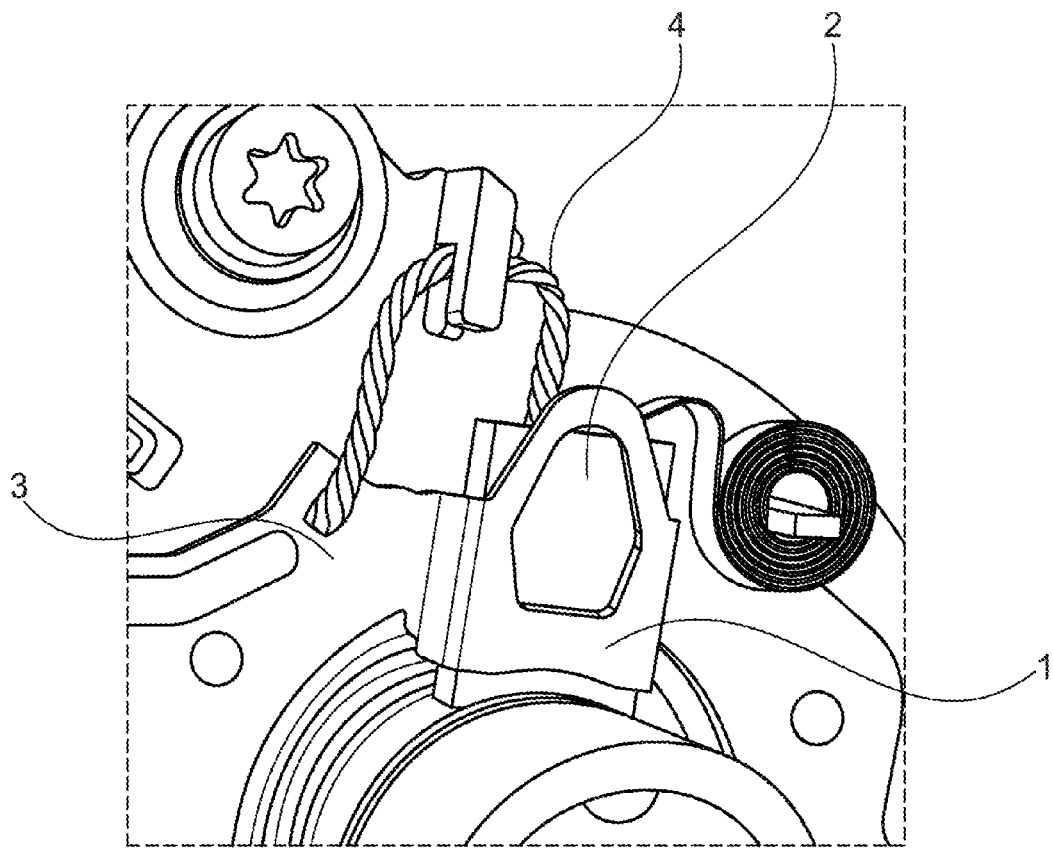
FIG. 8 shows a photographic representation of a current transmission sub-device with a carbon brush holder according to the internal prior art.

FIG. 8 shows a photographic representation of a current transmission sub-device with a carbon brush holder according to the internal prior art. The stranded-conductor guide shown therein tends toward flapping, which is at least reduced according to the invention.

The invention claimed is:

1. A current transmission sub-device of a current-excited synchronous machine, a rotor of which has slip rings for a current supply and is contacted and supplied with electrical energy by carbon brushes, the current transmission sub-device comprising:
   at least one brush compartment for receiving a carbon brush, wherein the carbon brush has a pre-mounted stranded conductor and wherein the at least one brush compartment is applied on a brush carrier and has a stranded-conductor guide, in such a way that the carbon brush is insertable into the brush compartment and the pre-mounted stranded conductor is insertable through the stranded-conductor guide for connection to the brush carrier so as to reduce flapping;
   wherein the stranded-conductor guide is configured as a recess disposed at a lateral side of the at least one brush compartment and a bridge-like connection from an upper edge of the recess of the at least one brush compartment to the brush carrier, at a distance from the carbon brush.

2. The current transmission sub-device according to claim 1, wherein the upper edge of the recess protrudes beyond the carbon brush to the brush carrier, at a distance from the carbon brush.

3. The current transmission sub-device according to claim 2, wherein the bridge-like connection extends from a left edge of the recess to a right edge of the recess of the at least one brush compartment, at a distance from the carbon brush.

4. The current transmission sub-device according to claim 1, wherein the bridge-like connection extends from a left edge of the recess to a right edge of the recess of the at least one brush compartment, at a distance from the carbon brush.

5. A current transmission sub-device of a current-excited synchronous machine, a rotor of which has slip rings for a current supply and is contacted and supplied with electrical energy by carbon brushes, the current transmission sub-device comprising:
   at least one brush compartment for receiving a carbon brush, wherein the carbon brush has a pre-mounted stranded conductor and wherein the at least one brush compartment is applied on a brush carrier and has a stranded-conductor guide, in such a way that the carbon brush is insertable into the brush compartment and the pre-mounted stranded conductor is insertable through the stranded-conductor guide for connection to the brush carrier so as to reduce flapping;
   wherein the stranded-conductor guide is configured as a recess disposed at a front side of the at least one brush compartment and a bridge-like connection from an upper edge of the recess, which protrudes beyond the carbon brush to the brush carrier, at a distance from the carbon brush.

6. The current transmission sub-device according to claim 5, wherein the bridge-like connection extends from a left edge of the recess to a right edge of the recess of the at least one brush compartment, at a distance from the carbon brush.

7. A current transmission sub-device of a current-excited synchronous machine, a rotor of which has slip rings for a current supply and is contacted and supplied with electrical energy by carbon brushes, the current transmission sub-device comprising:
- at least one brush compartment for receiving a carbon brush, wherein the carbon brush has a pre-mounted stranded conductor and wherein the at least one brush compartment is applied on a brush carrier and has a stranded-conductor guide, in such a way that the carbon brush is insertable into the brush compartment and the pre-mounted stranded conductor is insertable through the stranded-conductor guide for connection to the brush carrier so as to reduce flapping;
- wherein the stranded-conductor guide is configured as a recess disposed at a front side of the at least one brush compartment and a bridge-like connection from a left edge of the recess to a right edge of the recess of the at least one brush compartment, at a distance from the carbon brush.

\* \* \* \* \*